United States Patent [19]
Adams

[11] 3,849,932
[45] Nov. 26, 1974

[54] PLANT STARTING APPARATUS
[76] Inventor: J. Henry Adams, 64 Onyx Ave., Walla Walla, Wash. 99326
[22] Filed: June 6, 1973
[21] Appl. No.: 367,567

[52] U.S. Cl.................. 47/37, 47/34.13, 220/23.4, 206/423, 229/28 R, 206/75
[51] Int. Cl............................ A01g 9/10, B65d 5/48
[58] Field of Search ............ 47/37, 34, 34.11, 34.1, 47/37.2–37.6, 14, 34.13, 38; 206/46 PL, DIG. 32, 75; 229/27, 28 R, 15; 220/17, 22.3, 23.4, 23.6; 249/112, 113

[56] References Cited
UNITED STATES PATENTS

| 907,550 | 12/1908 | Young | 249/113 |
| 1,665,124 | 4/1928 | Wright | 47/37 |
| 2,010,683 | 8/1935 | Williams | 206/DIG. 32 |
| 2,318,711 | 5/1943 | Phelan | 47/34.13 |
| 3,084,790 | 4/1963 | Lugt, Jr. | 206/75 |
| 3,604,150 | 9/1971 | Baumann | 47/34 |
| 3,751,852 | 8/1973 | Schrepper | 47/34.13 |

FOREIGN PATENTS OR APPLICATIONS

| 668,757 | 3/1952 | Great Britain | 47/38 |
| 737,660 | 9/1955 | Great Britain | 47/34.13 |

Primary Examiner—Robert E. Bagwill
Assistant Examiner—Steven A. Bratlie
Attorney, Agent, or Firm—Wells, St. John & Roberts

[57] ABSTRACT

An apparatus for initially starting plants from seeds is described herein comprising a rectangular container releasably holding a corrugated support element. Open ended troughs fit within the grooves of the support element. The troughs may be filled with soil and seeds planted therein. The seeds may be allowed to grow within the troughs until they reach a plant size or condition suitable for transplanting. The troughs may then be removed from the container and placed with one open end in a furrow formed in the ground. The plants may be transferred from the troughs to the furrow, by sliding the trough relative to the soil and plants within the trough.

2 Claims, 5 Drawing Figures 3,849,932
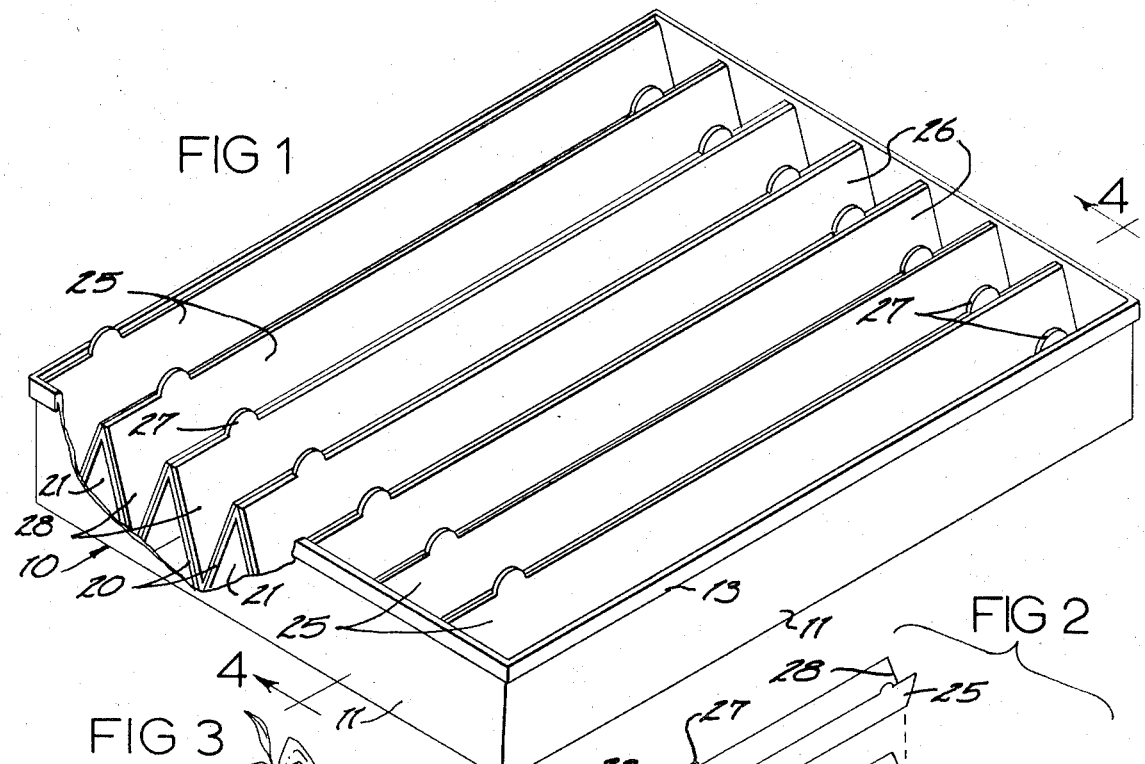
FIG 1
FIG 2
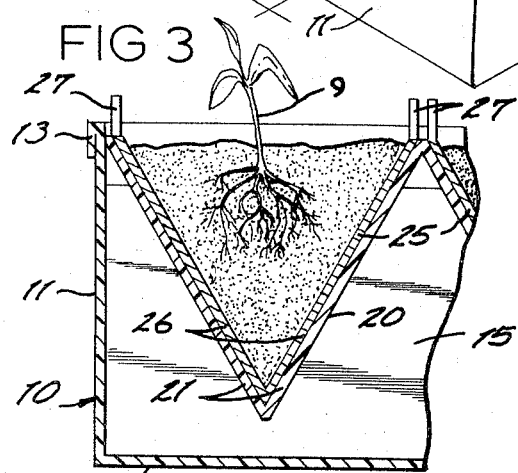
FIG 3
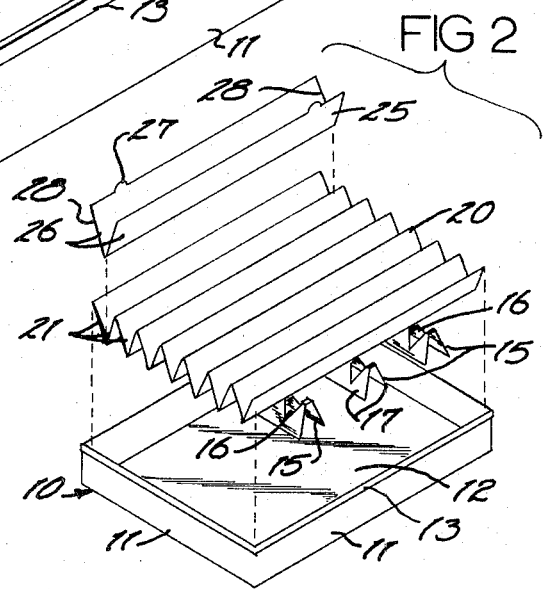
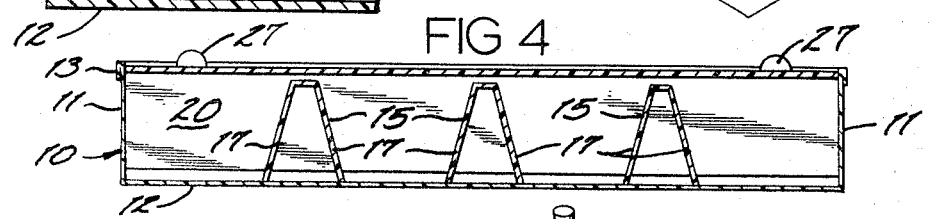
FIG 4
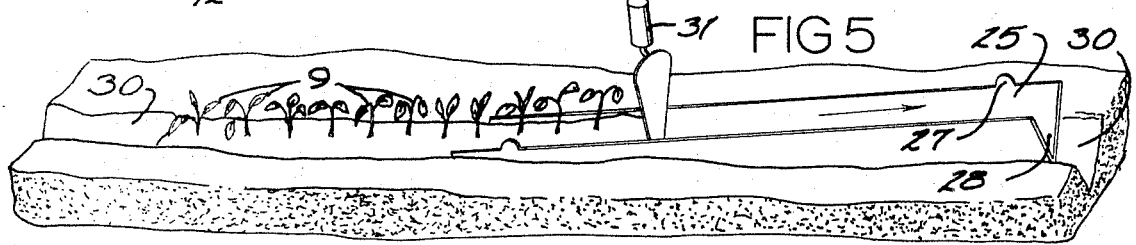
FIG 5

PLANT STARTING APPARATUS

BACKGROUND OF THE INVENTION

It is often a tedious and time consuming task to transplant individual plants from seed planters to the ground. Additionally, when large numbers of plants are to be incubated over a period of time, the individual seed planters require excessive amounts of storage area.

Planters have been made available that include provisions for planting more than one seed or seedling therein, but when the plants become mature enough to be transplanted, they must first be removed individually from the planters. Further difficulty arises in the transplanting process wherein the plants must be lifted individually from the planters and subsequently placed in the ground.

A prior device which has realized these problems to some extent is described in the A. Hasselbach U.S. Pat. No. 3,513,594. Hasselbach describes a container for preformed cubes of soil for plants. This container is utilized for simplified access to individual plants previously planted in the container by providing break away or fold out container sections.

The apparatus of the present invention includes a rectangular container holding a corrugated support element that in turn supports a plurality of removable troughs. Soil is placed within the troughs and seeds are planted in elongated rows within the soil. After the seeds have grown to plants of sufficient size to enable transplanting, the troughs may be removed from the container and the plants may be removed in rows from the troughs by sliding them endwise from the trough and into furrows in the ground.

SUMMARY OF THE INVENTION

A plant starting apparatus is described comprising an upwardly open container. A corrugated trough support is releasably supported within the container with its top edge located elevationally below the top edge of the container. Elongated open ended troughs of configurations complementary in cross section to the grooves of the corrugated trough support are releasably supported within the support. The trough support is held above the bottom of the container by transverse support elements having spaced slots formed therein complementary in configuration to the cross sectional shape of the corrugations of the corrugated trough support.

It is a first object of my invention to provide a seed starting apparatus that includes means for enabling seeds or seedlings to be planted therein in elongated rows.

It is a further object of my invention to provide such an apparatus that greatly simplifies transplanting of plants from planters to the ground.

It is an additional object of my invention to provide such an apparatus that is extremely simple in construction and thereby easy to manufacture.

It is a yet further object of my invention to provide such an apparatus that does not require excessive storage space.

Another object of my invention is to provide an apparatus that can be easily disassembled for cleaning purposes.

These and further objects and advantages will become evident upon the reading of the following description which, taken with the accompanying drawing, describe a preferred form of my invention.

A BRIEF DESCRIPTION OF THE DRAWINGS

FIG. 1 is a pictorial view of the seed planting apparatus;

FIG. 2 is an exploded pictorial view of the apparatus;

FIG. 3 is a fragmentary cross sectional view;

FIG. 4 is a longitudinal sectioned view taken along line 4—4 in FIG. 1; and

FIG. 5 is an operational view showing a row of seedlings being transplanted from a trough into a furrow in the ground.

DETAILED DESCRIPTION OF A PREFERRED EMBODIMENT

Referring now to the drawings in greater detail, the plant starting apparatus may be seen in FIGS. 1 and 2 basically comprising a rectangular container 10, a plurality of transverse support elements 15, a corrugated trough support 20, and a plurality of elongated troughs 25. The troughs 25 are utilized to hold soil as shown in FIG. 3, for the purposes of planting seeds or seedlings which are referred to by the reference numeral 9.

The container 10 includes upright side walls 11 formed about the periphery of a rectangular watertight bottom wall 12. The container includes rolled top edges 13.

The transverse support elements 15 may best be seen in FIGS. 2 and 4. The support elements 15 are A-shaped in cross section as shown in FIG. 4 having inclined sides 17. Slots 16 are formed within the sides 17 to removably receive the grooves of the corrugated support element 20. It may be noted in FIG. 4 that the transverse support elements 15 support the corrugated trough support slightly above the bottom 12 of container 10. This facilitates free movement of water across the bottom of the container.

The corrugated trough support 20 is comprised of a series of corrugated or angular sides 21. The support element 20 is complementary in size to the inside of the container 10. It will therefore loosely fit within the container with the top edges of the corrugations positioned slightly below the top edge of the container. The clearance between the top edge of the corrugations and the top edge of the container is sufficient to enable watering of the plants while supported within the troughs without the water running over the sides of the container.

The troughs 25 are V-shaped in cross section and are elongated, extending from one end to the other of the complementary grooves in the corrugated trough support. The troughs 25 are comprised of converging sides 26. The top edges of the sides 26 of troughs 25 include upwardly projecting tabs 27 which enable access to the troughs when supported within the container 10. As shown in FIGS. 1 and 2, the troughs 25 include open ends 28 which allow movement of the soil and plants contained therein longitudinally out of the troughs as shown in FIG. 5. When initially starting plants; however, the troughs are placed within the container 10 and the ends 28 are thereby closed by abutment with the sides 11 of the container. This facilitates placement of soil within the troughs without danger of the soil falling from the open ends 28.

The process involved in starting seeds, then subsequently transferring the plants grown therefrom into the soil may now be understood. Prior to planting, the troughs are placed within the container as shown in FIG. 1. They may then be filled with soil to the level of the top edges of the troughs 25. Seeds or small plants may then be planted in the soil in elongated rows. The seeds may then be tended or cared for in the same manner as if they were planted in a garden. Once the seeds have grown to sufficient size plants to enable transplanting in a garden, the individual troughs may be removed from the container and held with one open end 28 within a V-shaped furrow formed in the ground. A furrow 30 is shown in FIG. 5 along with a trough 25 and an elongated row of plants 9. To remove the plants from the trough, the gardener may hold a trowel 31 or some other pointed instrument similar in configuration to the inside of the trough, within the trough against one end of the row of plants. He then holds the trowel 31 stationary while pulling the trough 25 along the furrow 30. The result is that the plants 9 and soil previously held within the trough are transferred to the furrow 30.

An advantage of the wedge-shape of the troughs is that the resulting form of the elongated section of soil holding the plants 9 will fit within the furrow 30 and not require further tamping or recovering with soil. The wedge-shape serves to anchor the plants within the ground and to further become wedged within the furrow 30 as the plants are watered.

The construction of the individual troughs 25 may be such that the troughs themselves may be transferred from the container 10 and placed within the ground without removing the plants. This however would necessitate that the troughs be constructed of organic material such as compressed peat moss which would allow the roots of the plant to grow through the side walls 26. If continued use of the troughs 25 is desirable, they may be constructed of plastic or other suitable material.

It may become obvious from the above description and the attached drawings that various changes and modifications may be made therein without departing from the intended scope of this invention. Therefore, only the following claims are intended to define the invention.

What I claim is:

1. In a plant starting apparatus:
an upwardly-open watertight rectangular container having upright side and end walls extending about a horizontal bottom wall;
a corrugated trough support having an upper surface presenting a plurality of elongated parallel grooves and ridges extending from one end of the trough support to the other, the trough support being releasably supported within the container with top edges of the upright container side and end walls at an elevation above that of the ridges of the corrugations;
a plurality of elongated troughs, each complementary in cross section to the grooves within the corrugated trough support, said troughs being individually releasably supported within the respective grooves;
each trough having opposed open ends loosely abutting opposed upright end walls of the container; and
transverse support elements having spaced slots formed therein complementary in configuration to the cross-sectional shape of the corrugations of said corrugated trough support, the transverse support elements extending between the opposed side walls and being releasably held within the container to support the corrugated trough support elevationally above the bottom wall of the container.

2. A plant starting apparatus comprising:
an upwardly-open rectangular container having upright side and end walls extending about a horizontal bottom wall;
a corrugated trough support having an upper surface presenting a plurality of elongated parallel grooves and ridges extending from one end of the trough support to the other, the trough support being located within the container;
a plurality of elongated troughs each complementary in cross section to the grooves in the corrugated trough support and individually releasably supported within the respective grooves;
each trough having opposed open ends loosely abutting the opposed upright end walls of said container;
transverse support elements having spaced slots formed therein complementary in configuration to the cross-sectional shape of the corrugations of said corrugated trough support, said support elements extending between the opposed side walls of the container and positioned therein between the container bottom wall and corrugated trough support to hold the corrugated trough support elevationally above the bottom wall of the container.

* * * * *